United States Patent
Lim et al.

(10) Patent No.: US 9,799,947 B1
(45) Date of Patent: *Oct. 24, 2017

(54) MODULAR DEVICE SYSTEM DESENSE REDUCTION

(71) Applicant: Motorola Mobility LLC, Chicago, IL (US)

(72) Inventors: David Lim, Glenview, IL (US); Paul L Fordham, Wauconda, IL (US); Mark Janninck, Glen Ellyn, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,593

(22) Filed: Jun. 6, 2016

(51) Int. Cl.
*H04M 1/00* (2006.01)
*H01Q 1/24* (2006.01)
*H01Q 1/48* (2006.01)
*H01Q 13/10* (2006.01)
*H04M 1/02* (2006.01)

(52) U.S. Cl.
CPC ............ *H01Q 1/243* (2013.01); *H01Q 1/48* (2013.01); *H01Q 13/10* (2013.01); *H04M 1/0266* (2013.01); *H04M 1/0274* (2013.01)

(58) Field of Classification Search
CPC .......... H04M 1/00; H04M 1/02; H04M 1/725; H04B 15/02; H04B 1/10
USPC .... 455/347–349, 550.1, 575.1, 575.4, 575.8, 455/90.3
See application file for complete search history.

(56) References Cited

U.S. PATENT DOCUMENTS

| | | | |
|---|---|---|---|
| 8,798,694 B2* | 8/2014 | Morishita | H01Q 1/243 455/575.3 |
| 9,391,662 B2* | 7/2016 | Kim | H04B 1/3888 |
| 9,634,774 B1* | 4/2017 | Mohammad Sayem | H04B 15/02 |
| 2003/0019179 A1* | 1/2003 | Colson | E04B 9/00 52/506.06 |
| 2006/0079298 A1* | 4/2006 | Saitoh | H04M 1/0262 455/575.1 |
| 2010/0007563 A1* | 1/2010 | Varjonen | H01Q 1/243 343/702 |
| 2011/0201392 A1* | 8/2011 | Spoto | H01Q 1/243 455/575.4 |
| 2012/0329524 A1* | 12/2012 | Kent | G06F 3/044 455/566 |
| 2014/0240186 A1* | 8/2014 | Zhou | H01Q 13/06 343/772 |
| 2014/0333486 A1* | 11/2014 | Greetis | H01Q 1/52 343/702 |

(Continued)

*Primary Examiner* — Dominic Rego
(74) *Attorney, Agent, or Firm* — Miller, Matthias & Hull LLP (57) ABSTRACT

A modular device system is provided having a base portable electronic communication device. The base portable electronic communication device has a display side and a reverse side, and one or more antennas being located along one of the device edges. A ground element on the reverse side of the housing is adjacent to the antennas and is grounded to the chassis. A multi-pin connector array on the same side is located adjacent to the ground element and the ground element lies between the connector array and the antennas. The ground element is configured to contact a mating ground element on an add-on module when the module is mated to the base portable electronic communication device.

20 Claims, 7 Drawing Sheets

(56) References Cited

U.S. PATENT DOCUMENTS

2015/0288053 A1* 10/2015 Saxe .................. H01Q 1/243
                                                    343/702
2016/0218416 A1* 7/2016 Van Wonterghem .. H01Q 21/28
2016/0226131 A1* 8/2016 McMilin ............... H01Q 1/243
2017/0110798 A1* 4/2017 Ramachandran ..... H01Q 1/243

* cited by examiner

MODULAR DEVICE SYSTEM DESENSE REDUCTION

TECHNICAL FIELD

The present disclosure is related generally to mobile communication devices, and, more particularly, to a system and method for mitigating unwanted RF coupling in a modular portable device system.

BACKGROUND

High-frequency electronic signals are useful with respect to increasing data rates and hence device response times. However, as data rates increase, the inventors have discovered that coupling between high-frequency lines or connectors and nearby antennas also increases. The effect is two-way, in that signals associated with high frequency antennas may also couple into nearby high-frequency lines or connectors.

While the present disclosure is directed to a system that can eliminate certain shortcomings noted in or apparent from this Background section, it should be appreciated that such a benefit is neither a limitation on the scope of the disclosed principles nor of the attached claims, except to the extent expressly noted in the claims. Additionally, the discussion in this Background section is reflective of the inventors' own observations, considerations, and thoughts, and is not intended to catalog or summarize any item of prior art. As such, the inventors expressly disclaim this section as admitted or assumed prior art. Moreover, the identification or implication herein of a desirable course of action reflects the inventors' own observations and ideas, and therefore cannot be assumed to indicate an art-recognized desirability.

SUMMARY

In keeping with an embodiment of the disclosed principles, a modular device system is provided having a base portable electronic communication device with a chassis and housing and one or more antennas located along one of the top, bottom and side edges of the device. A ground element on the reverse side of the housing is adjacent to the one or more antennas, and a multi-pin connector array is adjacent to the ground element such that the ground element lies between the connector array and the antennas.

In another embodiment, a modular device connection system is provided for physically and electrically connecting an electronic module to a portable electronic communication device. A ground element is provided adjacent to the device antennas, the ground element being grounded to a chassis of the device. A multi-pin connector array is located adjacent to the ground element such that the ground element lies between the connector array and the one or more antennas.

In yet another embodiment, a modular electronic device system is provided having a portable electronic device with a device ground element on the device housing adjacent to one or more device antennas. The device ground element is grounded to the device chassis, and lies between the antennas and a device multi-pin connector array. Similarly, a mating electronic module has a multi-contact module ground element providing a module ground. Similarly, a module multi-pin module connector array is provided and the multi-contact module ground element and module multi-pin module connector array are configured and located to electrically connect to the device ground element and the device multi-pin connector array respectively when the electronic module is mated to the portable electronic device.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a fuller discussion of the disclosed principles, an overview is given to aid the reader in understanding the later material. As noted above, Within the modular concept conceived by the inventors, an external unit ("mod" or "module") is configured to connect to a base unit (e.g., a mobile phone) through multiple exposed connectors to enhance user experience. Modules may provide enhanced imaging, entertainment, presentation and other functionality. In an embodiment, the phone may also connect to docks, computers, tablets, etc. using the same connector configuration The communication between the phone and the module may happen at varying speeds, from DC up to 5 Gbps or higher. These high speed connectors are in close proximity of the transmit and receive antennas of the device. Hence attaching a mod to the device may generate noise from the exposed connectors, which elevates a noise floor used to separate noise from signal, and thus may lead to desensitization of the phone's cellular receivers. This phenomenon may be referred to herein as "desense." In addition, interference from the cellular transmit antennas may cause the devices to throttle data transfer through the exposed mod connectors due to reverse desense.

Embodiments of the disclosed principles mitigate desensitization of the phone RF/Antenna system from unshielded high speed pin connections between phone and mod by implementing a ground wall is linked across the phone and the mod. This may be implemented by placing a metal bar (sometimes referred to herein as a "debar') on the phone face, with the debar being tied to the reference ground on the phone's PCB (printed circuit board). The debar may extend beyond the width of the connector pin array, and in an embodiment extends outside of the width of the connector pin array by about 8 mm on either side. It will be appreciated that the length of the debar may be longer or shorter depending on specific design features in a given instance.

The debar separates the mod connector array from the nearest antennas, e.g., the bottom antennas. A similarly metal bar is tied to the mod's PCB. In a further embodiment, these two bars are connected to each other through an array of pogo pins (e.g., about 8 of them, although a lesser or greater number may be used depending on specific design features in a given instance. It will be appreciated that with respect to the connector array, it is not important which device includes which of the pogo pins and debar, or which contains which of the electrical connector types. As will be shown later, use of the debar system significantly reduces interference and thus reduces desense.

Additionally, a metal plate may be placed over the connector array with holes located to allow connector pins to pass through for additional isolation. The metal plate is electrically connected via solder or conductive adhesive to the AMP PCB ground chassis, and may conductively contact the phone metal backing when the AMP is attached to phone, thereby filling the non-metal gap around the connector pins with shielding metal, but not forming an overlapping ground shield into the phone (unlike USB or HDMI connectors), thereby maintaining ID integrity of the back of the phone.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

Figure 1:
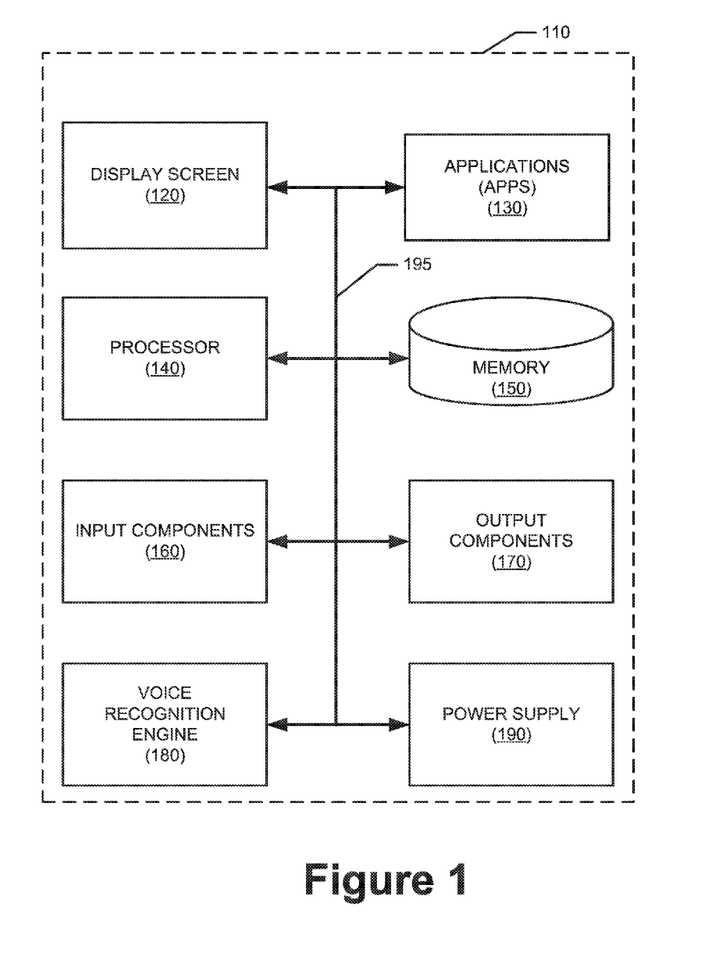
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device or phone, and the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 (user input receiver) such as speech and text input facilities, and one or more output components 170 such as text and audible output facilities, e.g., one or more speakers. In an embodiment, the input components 160 include a physical or virtual keyboard maintained or displayed on a surface of the device. In various embodiments motion sensors, proximity sensors, camera/IR sensors and other types of sensors may be used to collect certain types of input information such as user presence, user gestures and so on.

The processor 140 may be any of a microprocessor, microcomputer, application-specific integrated circuit, and like structures. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system services and handling of protected and unprotected data stored in the memory 150. Although some applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation. The device 110 also includes a camera module 180, which is linked to a device camera.

In an embodiment, a power supply 190, such as a battery or fuel cell, is included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Applications and software reside on a tangible non-transitory medium, e.g., RAM, ROM or flash memory, as computer-readable instructions. The device 110, via its processor 140, runs the applications and software by retrieving and executing the appropriate computer-readable instructions.

Figure 2:
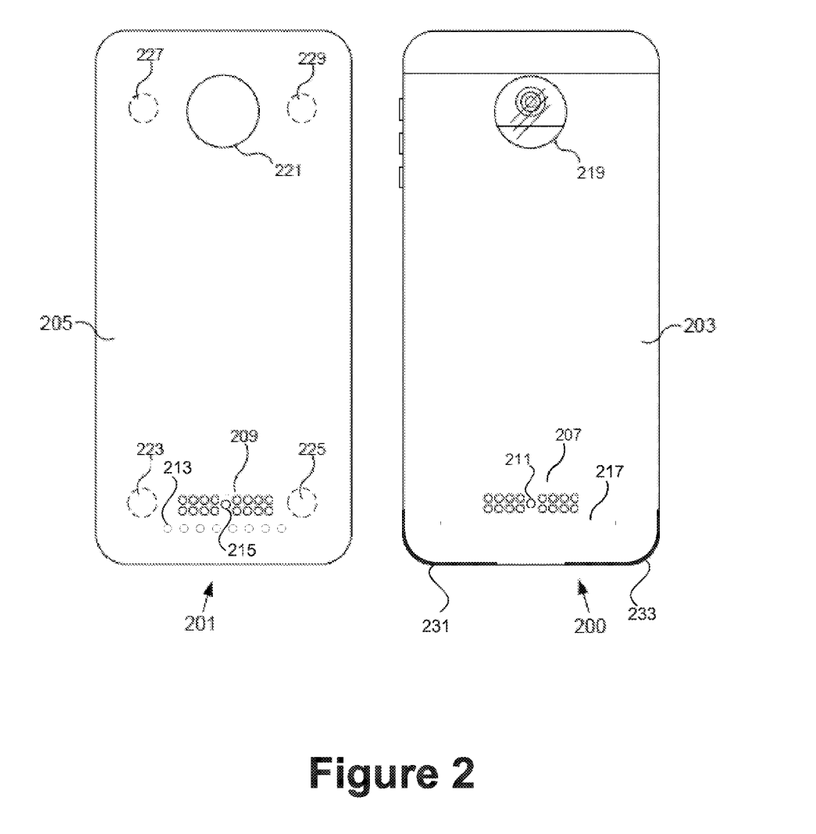
FIG. 2 is view of a first device and a second device, showing the back of the first device and the back of the second device in accordance with an embodiment of the disclosed principles.

Turning to FIG. 2, this figure illustrates a simplified view of the phone 200 and the module 201, showing the back 203 of the phone 200 and the mating front 205 of the module 201 in accordance with an embodiment of the disclosed principles. In the illustrated example, each device 200, 201 includes a connector array 207, 209. Although each connector array 207, 209 is shown as a 16-pin connector array, it will be appreciated that other numbers of pins may be used. Although not detailed in the figure, one of the connector arrays 207, 209 will typically include spring-loaded male pins while the other 207, 209 will typically include corresponding female sockets or contacts. The grounded debar discussed above can be seen in FIG. 2 as element 217, and the mating pogo connectors as element 213. The phone 200 also includes one or more antennas 231, 233.

In the illustrated embodiment, an alignment socket 211 is included within the connector array 207 on the phone 200, for mating with a matching alignment pin 215 on the module 201. A third alignment point is provided by a camera protrusion 219 on the phone 200, which is configured and located to fit with a mating circular opening 221 in the module 201. In an embodiment, the camera protrusion 219 contains the main camera of the device 200 as well as one or more flash LEDs. In an embodiment, the camera protrusion 219 also includes a laser range-finder for faster focus of the main camera.

As noted above, although other camera protrusion shapes are usable and are contemplated herein, a circular shape will be used for the sake of example. Depending upon tolerances in a given implementation, a non-circular camera protrusion may provide a degree of rotational alignment as well and may limit or eliminate the need for other alignment features.

In an embodiment, a set of magnets 223, 225, 227, 229 is embedded in the front of the module 201. These magnets 223, 225, 227, 229 may be retained on an inner surface of this cosmetic sheet. These magnets may be encased in a steel shroud such that the magnetic field is focused to one side of the magnet assembly rather than extending to both sides. In an embodiment, these magnets 223, 225, 227, 229 attract the steel surface of the back 203 of the phone 200 so as to hold the devices 200, 201 together once the devices 200, 201 are in close proximity. The magnets 223, 225, 227, 229 may be of ceramic, neodymium or other type.

Figure 3:
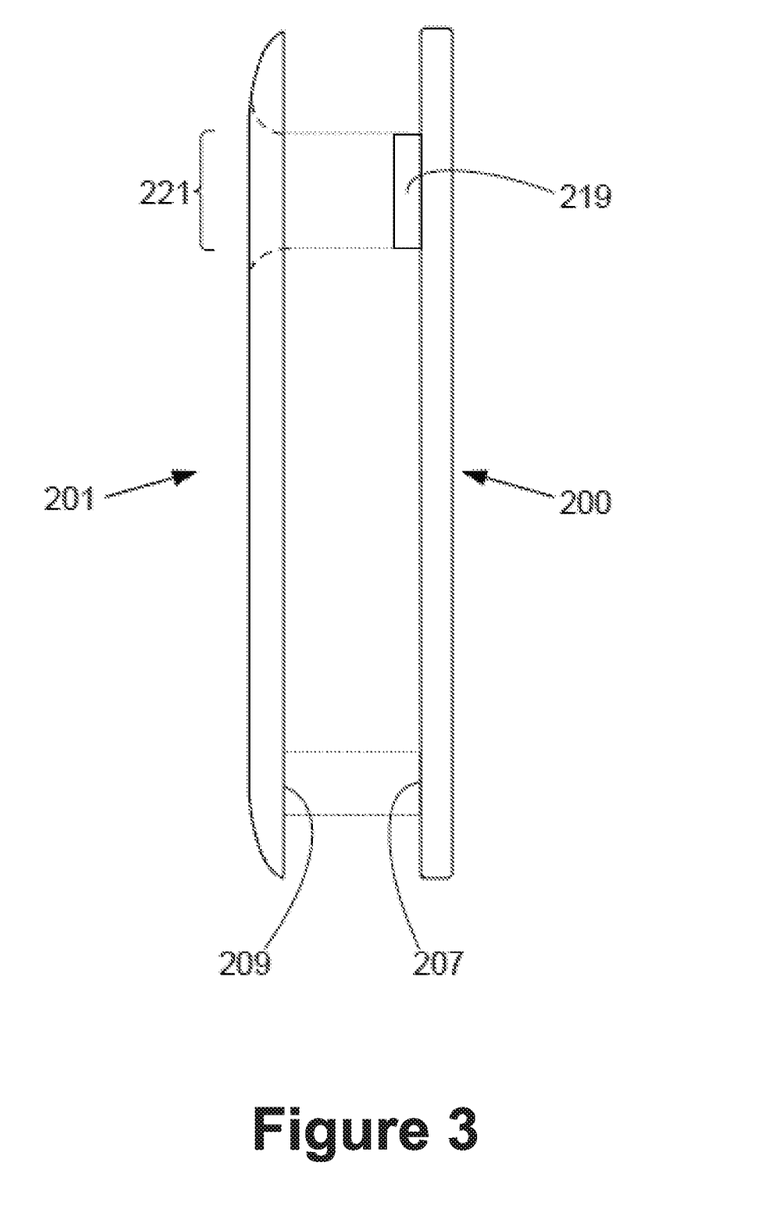
FIG. 3 is a side view of a phone and module in accordance with an embodiment of the disclosed principles.

FIG. 3 is a side view of the phone 200 and the module 201 in accordance with an embodiment of the disclosed principles. As briefly shown in the side view of FIG. 3, when the phone 200 and the module 201 are docked together, the camera protrusion 219 fits into the mating opening 221 in the module 201. In addition, the contact array 207 of the phone 200 mates with the contact array 209 of the module 201 in this configuration.

Ideally the combined device acts as one, using the connections provided by the mating contact arrays 207, 209. In particular, the contact arrays 207, 209 are used in various embodiments to exchange data, commands, power, control signals and so on.

Figure 4:
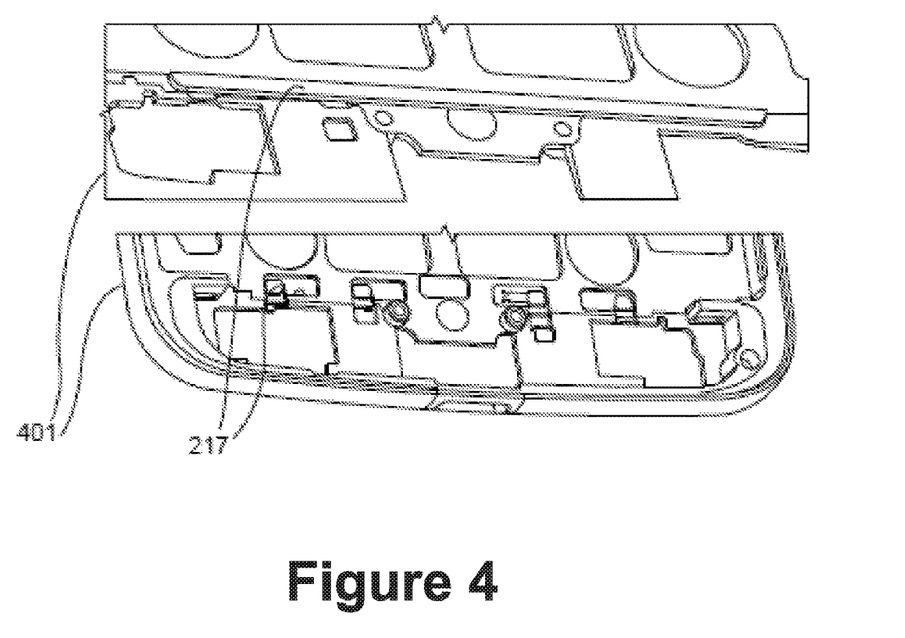
FIG. 4 is a subassembly view showing a portion of the rear housing in top and bottom views in accordance with an embodiment of the disclosed principles.

FIG. 4 is a subassembly view showing a portion of the rear housing 401 in top and bottom views, in an embodiment wherein the debar 217 is ski-booted/toed into the rear housing 401 to have multiple direct contact points grounding to the main PCB.

Figure 5:
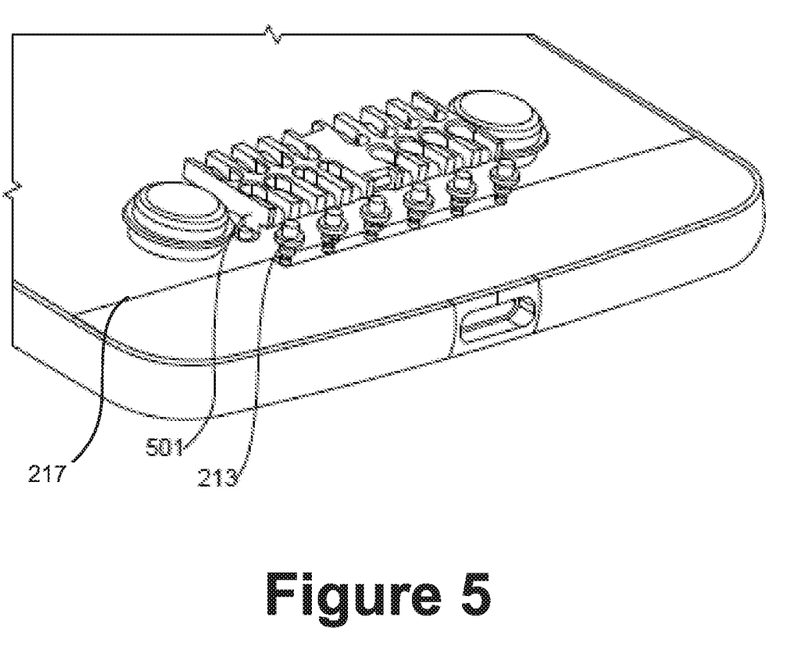
FIG. 5 is a simplified view of a connector arrangement for connecting to a continuous debar in accordance with an embodiment of the disclosed principles.

FIG. 5 is a detail view of the pogo connectors 213 and a connector array shroud 501 in accordance with an embodiment of the disclosed principles. As can be seen, the pogo connectors 213 are positioned to contact the debar 217 (FIG. 2) when the phone 200 and module 201 are mated together. The grounded shroud 501 partially surrounds each connector pin in the array 209 (FIG. 2), providing additional shielding.

Figure 6:
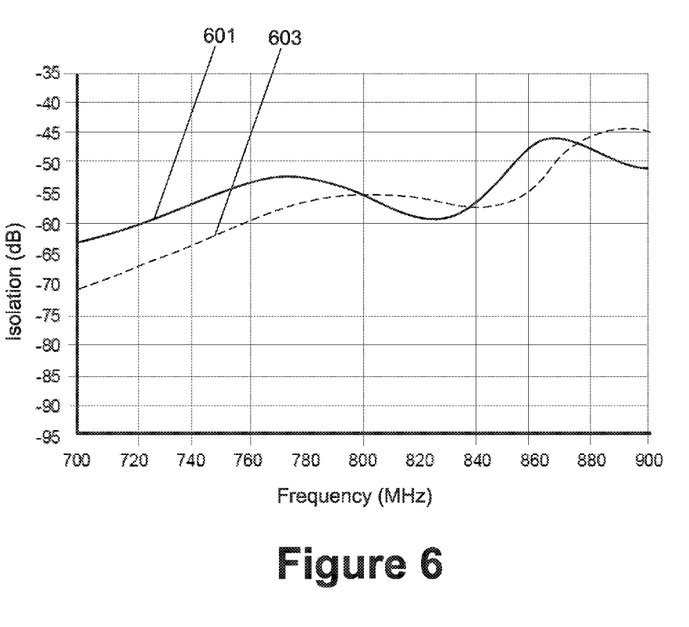
FIG. 6 is a data plot showing the isolation effect, in dB, of employing a debar of 44 mm in a modular configuration in accordance with an embodiment of the disclosed principles.

As noted above, the use of a debar, as described herein or similar, can significantly increase isolation of the antennas and the pins of the connector arrays. FIG. 6 is data plot showing the isolation effect, in dB, of employing a debar of 44 mm in a modular configuration as described herein. In particular, a first plot 601 shows the original level of isolation and a second plot 603 shows the level of isolation achieved using the debar. As can be seen, use of the debar increases isolation by more than 5 dB throughout the range from about 700 MHz to about 870 MHz.

Figure 7:
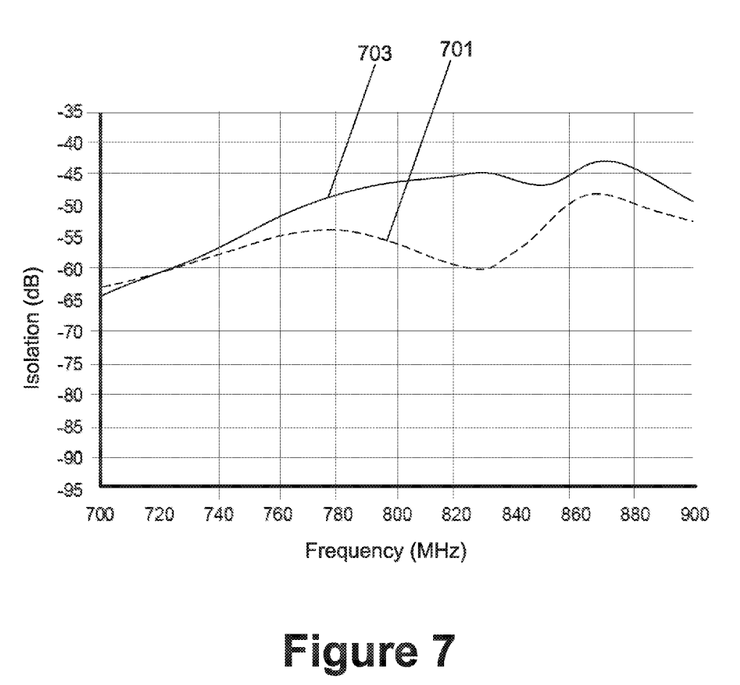
FIG. 7 is a data plot showing the isolation effect, in dB, of employing a debar of 27 mm in a modular configuration in accordance with an embodiment of the disclosed principles.

FIG. 7 is data plot showing the isolation effect, in dB, of using a debar of a different length than that used in the plot of FIG. 6, namely a debar of 27 mm. The first plot 701 shows the original level of isolation and a second plot 703 shows the level of isolation achieved using the debar of 27 mm. In this case, the isolation effect is worse than with the longer debar.

It will be appreciated that a system and method for improved mobile phone isolation for a modular system have been described herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A modular device system including a base portable electronic communication device comprising:
   a chassis;
   a housing at least partially encompassing the chassis, having a display side and a reverse side, and having top, bottom and side edges, wherein one or more antennas are located along one of the top, bottom and side edges;
   a ground element exposed on the reverse side of the housing and being adjacent to the one or more antennas, the ground element being grounded to the chassis; and
   a multi-pin connector array on the reverse side and being adjacent to the ground element such that the ground element lies between the connector array and the one or more antennas, the multi-pin connector array being configured and located to electrically connect to a mating array on a module device when the module device is mated to the base portable electronic communication device.

2. The modular device system in accordance with claim 1, wherein the ground element is an elongated metal bar positioned to mate with one or more grounded contacts on the module device when the module device is mated to the base portable electronic communication device.

3. The modular device system in accordance with claim 2, wherein the elongated metal bar comprises at least one tab for mating to at least one slot on the chassis.

4. The modular device system in accordance with claim 1, wherein the ground element comprises a line of grounded contacts positioned to mate with an elongated metal bar on the module device when the module device is mated to the base portable electronic communication device.

5. The modular device system in accordance with claim 1, wherein the one or more antennas are located along one of the top edge and bottom edge of the housing.

6. The modular device system in accordance with claim 1, wherein the one or more antennas are located along one of the side edges of the housing.

7. The modular device system in accordance with claim 1, further comprising a metal plate overlying the multi-pin connector array and having a plurality of holes there though such that the pins of the multi-pin connector array remain exposed on the reverse side of the housing.

8. The modular device system in accordance with claim 7, wherein the metal plate is electrically connected to the chassis.

9. A modular device connection system for physically and electrically connecting an electronic module to a portable electronic communication device that includes one or more antennas at an edge thereof, the connection system comprising:
 a ground element adjacent to the one or more antennas, the ground element being grounded to a chassis of the portable electronic communication device; and
 a multi-pin connector array adjacent to the ground element such that the ground element lies between the connector array and the one or more antennas, the multi-pin connector array being configured and located to electrically connect the electronic module to the portable electronic communication device.

10. The modular device connection system in accordance with claim 9, wherein the ground element is an elongated metal bar.

11. The modular device connection system in accordance with claim 10, wherein the elongated metal bar comprises at least one tab for mating to at least one slot on the chassis.

12. The modular device connection system in accordance with claim 9, wherein the ground element comprises a line of grounded contacts.

13. The modular device connection system in accordance with claim 9, wherein the one or more antennas are located along one of the top edge and bottom edge of the portable electronic communication device.

14. The modular device connection system in accordance with claim 9, wherein the one or more antennas are located along one of the side edges of the portable electronic communication device.

15. The modular device connection system in accordance with claim 9, further comprising a metal plate overlying the multi-pin connector array and having a plurality of holes there though such that the pins of the multi-pin connector array are exposed through the plate.

16. The modular device connection system in accordance with claim 15, wherein the metal plate is electrically connected to the chassis of the portable electronic communication device.

17. A modular electronic device system comprising:
 a portable electronic device having a chassis, a housing at least partially encompassing the chassis and having a display side and a reverse side and having top, bottom and side edges, wherein one or more antennas are located along one of the top, bottom and side edges, a device ground element exposed on the reverse side of the housing adjacent to the one or more antennas, the device ground element being grounded to the chassis, and a device multi-pin connector array on the reverse side adjacent to the device ground element such that the device ground element lies between the device multi-pin connector array and the one or more antennas; and
 an electronic module having a multi-contact module ground element providing a module ground and a module multi-pin module connector array, wherein the multi-contact module ground element and the module multi-pin module connector array are configured and located to electrically connect to the device ground element and the device multi-pin connector array respectively when the electronic module is mated to the portable electronic device.

18. The modular electronic device system in accordance with claim 17, wherein the multi-contact module ground element comprises a linear array of a plurality of spring-loaded contacts.

19. The modular electronic device system in accordance with claim 18, wherein the device ground element is an elongated metal bar positioned to mate with the plurality of spring-loaded contacts when the module device is mated to the base portable electronic communication device.

20. The modular electronic device system in accordance with claim 19, wherein the elongated metal bar comprises at least one tab for mating to at least one slot on the chassis.

* * * * *